United States Patent
Castellani et al.

(10) Patent No.: US 7,162,130 B2
(45) Date of Patent: Jan. 9, 2007

(54) OPTICAL FIBER WITH THERMOPLASTIC MATERIAL BASED COATING

(75) Inventors: Luca Castellani, Corsico (IT); Giovanni Brandi, Milan (IT); Mauro Maritano, Monza (IT); Franco Peruzzotti, Legnano (IT); Giacomo Stefano Roba, Monza (IT); Sabrina Fogliani, Segrate (IT); Lidia Terruzzi, Triugguio (IT)

(73) Assignee: Prysmian Cavi e Sistemi Energia S.r.l., Milan (IT)

( * ) Notice: Subject to any disclaimer, the term of this patent is extended or adjusted under 35 U.S.C. 154(b) by 0 days.

(21) Appl. No.: 10/531,954

(22) PCT Filed: Oct. 23, 2002

(86) PCT No.: PCT/EP02/11829

§ 371 (c)(1),
(2), (4) Date: Jan. 13, 2006

(87) PCT Pub. No.: WO2004/037739

PCT Pub. Date: May 6, 2004

(65) Prior Publication Data

US 2006/0127019 A1 Jun. 15, 2006

(51) Int. Cl.
*G02B 6/036* (2006.01)

(52) U.S. Cl. .............. 385/128; 385/123; 385/124; 385/125; 385/126; 385/127; 65/385; 264/1.24

(58) Field of Classification Search ............... 385/123, 385/124, 125, 126, 127, 128; 65/385; 264/1.24
See application file for complete search history.

(56) References Cited

U.S. PATENT DOCUMENTS 4,000,936 A 1/1977 Gloge (Continued)

FOREIGN PATENT DOCUMENTS

EP 0 155 070 B1 9/1985

(Continued)

OTHER PUBLICATIONS

Olivia, et al., "Copolymerization of ethylene and styrene to a nearly-alternating crystalline copolymer", Macromol. rapid Commun, 17, pp. 745-748, (1996).

(Continued)

*Primary Examiner*—Frank G. Font
*Assistant Examiner*—Guy G. Anderson
(74) *Attorney, Agent, or Firm*—Finnegan, Henderson, Farabow, Garrett & Dunner, L.L.P.

(57) ABSTRACT

Optical fiber having a glass portion; at least one protective coating of thermoplastic material having at least one thermoplastic elastomer; the thermoplastic material having the following characteristics: a modulus of elasticity value at +25° C. lower than 150 MPa, preferably at least 10 Mpa, more preferably higher than 20 Mpa, and a Vicat point higher than 85° C., preferably higher than 120° C., more preferably lower than 350° C. Preferably, the coating is a single protective coating directly positioned onto the glass portion.

49 Claims, 3 Drawing Sheets

U.S. PATENT DOCUMENTS

| | | | |
|---|---|---|---|
| 4,105,284 A | | 8/1978 | Olshansky |
| 4,167,305 A | * | 9/1979 | Ichiba et al. ............... 385/141 |
| 4,351,657 A | * | 9/1982 | Kimura et al. ............... 65/432 |
| 4,496,210 A | * | 1/1985 | Ansel et al. ............... 385/128 |
| 4,682,850 A | | 7/1987 | White et al. |
| 4,806,574 A | * | 2/1989 | Krajewski et al. ............ 522/96 |
| 5,494,969 A | | 2/1996 | Abe et al. |
| 5,569,711 A | | 10/1996 | Yamamoto et al. |
| 5,639,846 A | * | 6/1997 | Shustack ............... 528/44 |
| 5,741,869 A | | 4/1998 | Goodall et al. |
| 5,925,462 A | * | 7/1999 | Girgis ............... 428/392 |
| 6,110,592 A | * | 8/2000 | Grizante et al. ............ 428/375 |

FOREIGN PATENT DOCUMENTS

| | | |
|---|---|---|
| EP | 0 416 815 B1 | 3/1991 |
| EP | 0 514 828 A1 | 11/1992 |
| EP | 1 112 979 A1 | 7/2001 |
| WO | WO 99/26891 | 6/1999 |
| WO | WO 99/67180 | 12/1999 |
| WO | WO 01/12708 A1 | 2/2001 |
| WO | WO 02/061317 A2 | 8/2002 |

OTHER PUBLICATIONS

Chen, et al., "Large Strain Stress Relaxation and Recovery Behavior of Amorphous Ethylene-Styrene Interpolymers", Macromolecules 1999, vol. 32, No. 22, 1999 American Chemical Society, pp. 7587-7592, (1999).

Schneider et al.; "Enlargement of the glass transition range in compatible polymer blends", Makromol. Chem. vol. 191, pp. 2377-2386, (1990).

Semetz et al.; "Influence of polymerization conditions on the copolymerization of styrene with ethylene using $Me_2Si(Me_4C_p)(N$-tert-butyl)$TiCl_2$/methylaluminoxane Ziegler-Natta catalysts", Macromol. Chem. Phys., vol. 197, pp. 1071-1083 (1996).

* cited by examiner

OPTICAL FIBER WITH THERMOPLASTIC MATERIAL BASED COATING

CROSS REFERENCE TO RELATED APPLICATION

This application is a national phase application based on PCT/EP2002/011829, filed Oct. 23, 2002, the content of which is incorporated herein by reference.

BACKGROUND OF THE INVENTION

1. Field of the Invention

The present invention relates to an optical fiber with at least one thermoplastic material based coating.

More particularly, the present invention relates to an optical fiber with at least one protective coating of thermoplastic material comprising at least one thermoplastic elastomer.

2. Description of the Related Art

Optical fibers commonly consist of a glass portion (typically with a diameter of about 125 µm), inside which the transmitted optical signal is confined, and of a coating, typically polymeric, arranged around the glass portion for substantially protective purposes. This protective coating typically comprises a first coating layer positioned directly onto the glass surface, known as the "primary coating" or "primary" for short, typically having a thickness of between about 25 µm and about 35 µm. In turn, this primary coating is generally covered with a second coating layer, known as the "secondary coating" or "secondary" for short, typically having a thickness of between about 10 µm and about 30 µm.

These polymeric coatings may be obtained from compositions comprising oligomers and monomers that are generally crosslinked by means of UV irradiation in the presence of a suitable photo-initiator. The two coatings described above differ, inter alia, in terms of the modulus of elasticity value of the crosslinked material. As a matter of fact, one problem presented by the use of coatings which are adhered to the glass surface of the optical fiber is caused by the difference in response to change in temperature between the glass and the coating which contributes to microbending of the fiber, especially when very low temperatures are encountered. To minimize this problem, coating possessing a very low modulus of elasticity value are selected to provide the above mentioned primary coating. Consequently, in order to provide the desired low modulus of elasticity value in the primary coating, one must sacrifice desired hardness and thoughness in the coating which contact the glass, so as the above mentioned secondary coating has to be applied on the top of primary coating. The combination of said two layers of coating ensures adequate mechanical protection for the optical fiber.

The optical fiber thus composed usually has a total diameter of about 250 µm. However, for particular applications, this total diameter may also be smaller; in this case, a coating of reduced thickness is generally applied.

However, the necessity of using two coatings having different characteristics may present some drawbacks. For example, problems due to the adhesion between the primary and the secondary coatings may arise: it is therefore necessary to select polymeric materials which are compatible among themselves but which have different modulus of elasticity values in order to both avoid microbending and to obtain an adequate mechanical protection.

In order to overcome said drawbacks, some efforts have been made in the prior art to obtain optical fiber with a single coating.

For example, U.S. Pat. No. 4,682,850 discloses an optical fiber having a core and an outer cladding. The cladding is coated with only a single ultraviolet-cured material having tensile modulus in the range of about 1,000 psi to about 10,000 psi (about 7 MPa to about 70 MPa). Preferably, the modulus is about 7,800 psi (about 53.8 MPa) at 25° C. and the material has a Shore A hardness of about 70 to about 75. According to the assertions made in the patent, said single coating satisfactorily protects the optical fiber, is easily applied to the fiber and minimizes microbending losses over a wide temperature range.

However, the modulus of elasticity value of a single ultraviolet coating of the type above disclosed remarkably changes with temperature causing microbending losses, in particular at low temperatures. Last but not least, it is well known that crosslinked materials cannot be recycled, so that manufacturing wastes and the covering material of cables which have reached the end of their life may be disposed of only by incineration.

Thermoplastic materials have also been employed either as a single coating or as a primary coating or as a secondary coating in a dual-layer coated optical fiber.

For example, U.S. Pat. No. 4,000,936 discloses an optical fiber jacket design for minimun distorsion loss. In one of the embodiment the optical fiber comprises a core surrounded by a cladding coated by a soft jacket comprising a soft thermoplastic material such as, for example, copolymer of ethylene and vinyl acetate, copolymer of ethylene and acrylic acid, copolymer of monochlorotrifluoroethylene and vinylidenefluoride. In a further embodiment, the optical fiber is coated with a jacket of a hard thermoplastic material such as, for example, polymethylmethacrylate, polycarbonate, nylon, teflon copolymer of tetrafluoroethylene and hexafluoropropylene (FEP), teflon tetrafluoroethylene (TFE) and teflon copolymer of tetrafluoroethylene and perfluorovinylmethylether (PFE) and a soft outer shell made from the soft thermoplastic material above disclosed.

U.S. Pat. No. 4,105,284 discloses an optical waveguide fiber having a protective jacket of such a construction that microbending losses are minimized. In one embodiment, a typical optical waveguide fiber which may be made from glass or plastic, is coated with a first protective layer of high modulus plastic material such as fluorocarbon, nylon, thermoplastic polyethylene, polycarbonate and the like. A second protective layer of low modulus plastic material such as polyurethane elastomer, ethylene vinyl acetate, polyvinyl chloride, thermoplastic rubber (TPR) or the like is disposed on the surface of said first protective layer.

U.S. Pat. No. 4,167,305 discloses an optical transmission fiber comprising an optical fiber which comprises (1) a core layer having a clad layer thereover, and (2) over said optical fiber at least one layer of a composition mainly comprising a thermoplastic resin having a functional group. Thermoplastic resin having a functional group may be selected from polyester, polyamide resin, ethylene vinylacetate copolymer, ethylene-acrylic acid copolymer, ionomer resins, ect. According to the assertions made in the application, said optical transmission fiber has an improved mechanical strength.

Patent Application EP 155 070 discloses a coated optical fiber wherein (a) the rubber composition of the first layer is a thermoplastic rubber composition which has a Young's modulus of 0.1 GPa (100 MPa) or less and which is capable of extrusion coating; (b) the thermoplastic resin composition of the second layer exhibits liquid crystallyzability in the molten state and its oriented state is maintained by forcible cooling immediately after the coating step; and (c) the thermoplastic resin composition has a linear expansion coefficient of $7 \times 10^{-5\circ}$ C.$^{-1}$ or less and a Young's modulus of 4.3 GPa (4300 MPa) or more and is capable of extrusion coating. The thermoplastic composition of the first layer may contain a styrene copolymer such as, for example, a styrene/butadiene block copolymer or an olefin copolymer.

According to the Applicant's experience the use of said thermoplastic materials as a coating for optical fibers not always allow to obtain good results, in particular in the case of a single coating. As a matter of fact, for example, polyesters such as polybutylene terephthalate, have too high modulus of elasticity value at room temperature, are easily subjected to hydrolysis and absorb too much humidity; ethylene-vinylacetate copolymer and styrene/butadiene block copolymers have a too low Vicat point and, consequently, too low thermo-mechanical properties.

The Applicant has however observed that, in order to obtain a thermoplastic coating for an optical fiber which is able to satisfactorily protect the fiber and to minimize microbending losses over a wide temperature range, the thermoplastic material forming said coating needs to have specific characteristics.

SUMMARY OF THE INVENTION

In particular, Applicant has found that it is possible to obtain a thermoplastic coating for an optical fiber which is able to satisfactorily protect the fiber and to minimizes microbending losses over a wide temperature range and which may be advantageously used as a single coating, by selecting a thermoplastic material having a high Vicat point (e.g. higher than 85° C.) and a low modulus of elasticity value at +25° C. (e.g. not higher than 150 MPa). Moreover, said thermoplastic material does not remarkably change the modulus of elasticity value upon temperature decreasing: consequently, said thermoplastic coating, is able to minimize the microbending losses over a wide temperature range, in particular in a temperature range of between +60° C. and −40° C. In addition, said thermoplastic material is easily recyclable thus overcoming the environmental problems above disclosed with regard to the use of crosslinked materials. Moreover, said thermoplastic material shows a low hydrogen emission. In addition, the optical fiber coated with said thermoplastic material, when utilized in an optical cable, shows good thermo-mechanical properties.

If thermoplastic material having a low Vicat point is used, the coating so obtained, particularly during the optical cable production or in the case of a hybrid energy/telecommunication cable, because of the high temperature which may be reached during working operation, may be subjected to permanent deformations which cause microbending losses.

According to a first aspect, the present invention thus relates to an optical fiber comprising:
  a glass portion;
  at least one protective coating of thermoplastic material comprising at least one thermoplastic elastomer (a);
characterized in that said thermoplastic material has the following characteristics:
  a modulus of elasticity value at +25° C. lower than 150 MPa, preferably of at least 10 MPa, more preferably higher than 20 Mpa;
  a Vicat point higher than 85° C., preferably higher than 120° C., more preferably lower than 350° C.

Said modulus of elasticity value is tensile modulus and is measured using a DMTA apparatus (Dynamic Mechanical Thermal Analyser from Reometrics Inc.), in traction, at a frequency of 1 Hz and at a heating rate of 2° C./min.: further details regarding the analysis method will be described in the examples given hereinbelow.

Said Vicat point is measured according to the ISO 306/A Standard, at 10N.

According to a preferred embodiment, said thermoplastic material has a melting point higher than 180° C., preferably not higher than 350° C.

Said melting point is measured by DSC (Differemtial Scanning Calorimetry): further details regarding the analysis method will be described in the examples given hereinbelow.

According to a further preferred embodiment, said thermoplastic material has a water absorption value, measured at 55° C., not higher than 2%, preferably not higher than 1%.

Said water absorption value is measured using a Igasorp machine from Iden Analytical working at a temperature of 55° C., with a relative humidity of 95%: further details regarding the analysis method will be described in the examples given hereinbelow.

According to a further preferred embodiment, said thermoplastic material has a Melt Flow Index (MFI), higher than 1 g/10 min, preferably higher than 5 g/10 min, more preferably of between 10 g/10 min and 100 g/10 min.

Said Melt Flow Index (MFI) is measured according to ASTM D1238-01e1 Standard, under 2.16 kg and at a temperature 30° C. higher with respect to the melting point of said thermoplastic material.

According to a further preferred embodiment, the ratio between the modulus of elasticity value at −40° C. and the modulus of elasticity value at +60° C. of said thermoplastic material is lower than 15, preferably of between 1 and 10.

Preferably, said thermoplastic material has a refractive index at room temperature higher than the refractive index of the glass portion (about 1.46), preferably higher than 1.48.

According to a further preferred embodiment, said thermoplastic material is a thermoplastic elastomer (a).

According to a preferred embodiment, said optical fiber comprises a glass portion and a single protective coating directly positioned onto said glass portion.

In the present description and in the claims, the term "single protective coating" includes either a single layer of a thermoplastic material or a plurality of layers, preferably two, substantially made from the same thermoplastic material. The term "substantially made from the same thermoplastic material" means that, apart from minor amounts, tipically less than 20% by weight with respect to the weight of the thermoplastic material, of additives (e.g. colouring agents), the thermoplastic material of the different layers of said coating is the same, i.e. the thermoplastic material forming the different layers has substantially the same mechanical properties, in particular the modulus of elasticity value at 25° C. and the Vicat point of said thermoplastic material show a variation of less than 15%.

According to a further preferred embodiment, said single protective coating includes an inner layer of thermoplastic material directly positioned onto said glass portion, and an outer layer of thermoplastic material comprising at least one colouring agent, directly positioned onto said inner layer.

Preferably, said protective coating has a thickness of between 20 µm and 70 µm, preferably not higher than 65 µm.

According to one preferred embodiment, the thermoplastic elastomer may be selected from:

(a1) copolyether esters or copolyester esters;
(a2) styrene block copolymers or terpolymers with different olefins and/or with dienes, such as, for example, with butene, ethylene, propylene, isoprene, butadiene;
(a3) copolymer of ethylene with at least one aromatic α-olefin.

The copolyether esters or copolyesters esters (a1), which may be used according to the present invention, are segmented block copolymers built up from hard, crystalline and relatively high-melting polyester segments and soft, flexible and relatively low-melting polyether or polyester segments. Suitable hard polyester segments are, for example, poly[($C_1$–$C_8$) linear or cyclic]alkylene terephthalates such as, for example, poly(butylene-naphthalene dicarboxylic acid), poly(cyclohexanedicarboxylic acid-cyclohexanemethanol) and, preferably, polybutylene-terephthalate and polytrimethyleneterephthalate-2,6-naphthalate. Other types of hard polyester segments conforming to the requirements set may be used in a block copolymers as well and also a plurality of types may be used simultaneously. Polyester units suited for hard crystalline segment are built up, for example, from an acid and a glycol. Suitable acids are, for example, terephthalic acid and 2,6-naphthalenedicarboxylic acid. In addition to the terephthalic acid and/or 2,6-naphthalenedicarboxylic acid a small amount of a different dicarboxylic acid may be added, for instance isophthalic acid, or an aliphatic dicarboxylic acid, for example, adipic acid, ciclohexane-1,4-dicarboxylic acid or dimeric acid. The chosen glycol component of the polyester unit may be a glycol having, for instance, two to twelve carbon atoms, for example, ethylene glycol, propylene glycol, tetramethylene glycol, neopentyl glycol, hexane diol or decane diol.

Suitable soft polyester segments are, for example, ($C_1$–$C_8$) linear aliphatic polyesters including polybutylene adipate and, preferably, polytetramethylene adipate and polycaprolactone. Other types of soft polyester segments conforming to the requirements set may be used in a block copolymer as well and also a plurality of types may be used simultaneously.

Suitable soft polyether segments are, for example, poly ($C_1$–$C_8$) linear alkylene oxides, including polytetramethylene oxide, polypropylene oxide, polyethylene oxide. Other types of polyether segments conforming to the requirements set may be used in a block copolymer as well and also a plurality of types may be used in a copolyester simultaneously.

Particularly preferred for the aim of the present invention are copolyether esters wherein the polyester segments are polyalkyleneterephthalates, preferably polybutyleneterephthalate, and the polyether segments are polyalkyleneoxides, preferably polytetramethyleneoxide.

The % (wt) ratio between the high-melting crystalline segment and the low-melting flexible segment of the copolyester is between 95:5 and 5:95, preferably between 70:30 and 30:70.

Thermoplastic elastomer (a1) which may be used according to the present invention are commercially available, for example, under the trademark Arnitel® from DSM. Arnitel® EM400 and Arnitel® EM460 are particularly preferred.

The styrene block copolymers or terpolymers with different olefins and/or with dienes (a2) which may be used according to the present invention may be selected from: styrene-butadiene-styrene (S-B-S), styrene-isoprene-styrene (S-I-S) and styrene-ethylene/butene-styrene (S-EB-S) triblock polymers; styrene-ethylene/propylene (S-EP) and styrene-ethylene/butene (S-EB) diblock polymers; styrene-butadiene or styrene-isoprene branched polymers, or mixtures thereof.

Thermoplastic elastomers (a2) which may be used according to the present invention are commercially available under the trademark Kraton® from Kraton Polymer.

With regard to the copolymer of ethylene with at least one aromatic α-olefin (a3) which may be used according to the present invention the term "aromatic α-olefin" generally means an olefin of formula (I):

$$CH_2=CH-(R_1R_2C)_x-C_6H_{5-y}(R_3)_y \quad (I)$$

wherein $R_1$, $R_2$ and $R_3$, which may be identical to or different from each other, represent hydrogen or a linear or branched alkyl group containing from 1 to 8 carbon atoms; or $R_3$, different from $R_1$ and $R_2$, represents an alkoxy group, a carboxyl group, an acyloxy group, said acyloxy group optionally being substituted with alkyl groups containing from 1 to 8 carbon atoms or hydroxyl groups or halogen atoms; x is 0 or an integer between 1 and 5 inclusive; y is 0, 1 or 2.

Specific examples of olefins of formula (I) are styrene; mono- or polyalkylstyrenes such as, for example, 4-methylstyrene, dimethylstyrene, ethyl-styrene, vinyltoluene; styrene derivatives containing functional groups such as, for example, methoxystyrene, ethoxystyrene, vinylbenzoic acid, methyl vinylbenzoate, vinylbenzyl acetate, hydroxystyrene, chlorostyrene, divinylbenzene; phenyl-substituted alkenes such as, for example, allylbenzene, 4-phenylbutene-1, 3-phenyl-butene-1, 4-(4-methylphenyl)butene-1,4-(3-methyl-phenyl)butene-1,4-(2-methylphenyl)butene-1,4-(4-ethylphenyl)butene-1,4-(4-butylphenyl)butene-1,5-phenylpentene-1,4-phenylpentene-1,3-phenylpentene-1,5(4-methylphenyl)pentene-1,4-(2-methylphenyl)-pentene-1, 3-(4-methylphenyl)pentene-1,6-phenyl-hexene-1,5-phenylhexene-1,4-phenylhexene-1,3-phenyl-hexene-1,6-(4-methylphenyl)hexene-1,5-(2-methylphenyl)hexene-1,4-(4-methyl-phenyl)hexene-1,3-(2-methylphenyl)hexene-1,7-phenylheptene-1,6-phenylheptene-1,5-phenylheptene-1,4-phenylheptene-1,8-phenyloctene-1,7-phenyloctene-1,6-phenyloctene-1,5-phenyloctene-1,4-phenyloctene-1,3-phenyloctene-1,10-phenyldecene-1; or mixtures thereof. The aromatic α-olefin is preferably chosen from styrene, vinyltoluene, or mixtures thereof. Styrene is particularly preferred.

The copolymer of ethylene with at least one aromatic α-olefin (a3) may be obtained by copolymerization of ethylene with an aromatic α-olefin, in the presence of a "single-site" catalyst such as, for example, a metallocene catalyst or of a so-called "Constrained Geometry Catalyst".

The synthesis of copolymers of ethylene with at least one aromatic α-olefin (a3) in the presence of metallocene catalysts is described, for example, in Macromol. Rapid. Commun., Vol. 17, pp. 745–748, (1996); or in Makromol. Chem., Vol. 191, pp. 2378–2396, (1990).

The synthesis of copolymers of ethylene with at least one aromatic α-olefin (a3) in the presence of catalysts so called "Constrained Geometry Catalyst" is described, for example, in Macromol. Chem. Phys., Vol. 197, p. 1071–1083, (1996); Macromolecules, Vol. 32, pp. 7587–7593; or in the patent applications WO 01/112078; EP 514 828, EP 416 815.

In the case in which the thermoplastic elastomer has a too low Vicat point (e.g. lower than 85° C.), in order to obtain a thermoplastic material having the desired characteristics, said thermoplastic material may further comprise:

(b) at least one thermoplastic crystalline polymer; or, alternatively, (c) at least one amorphous polymer.

In order to suitably increase the Vicat point of the thermoplastic material, said thermoplastic crystalline polymer (b) has, preferably, a melting point higher than 180° C., more preferably not higher than 350° C.

According to one preferred embodiment, said thermoplastic crystalline polymer (b) may be selected from: syndiotactic polystyrene (such as, for example, the commmercial product available under the trademark Questra® QA101 from Dow Chemical); poly(4-methyl-1-pentene), either as a homopolymer or as a copolymer with an α-olefin such as, for example, with ethylene, propylene, 1-butene, 1-hexene, 1-octene, 1-decene, 1-tetradecene, 1-octadecene (such as, for example, the commercial product available under the trademark TPX® from Mitsui); polyketones (such as, for example, the commercial product available under the trademark Carilon® DPP1000 from Shell Chemical); poly(phenylene sulfide) (such as, for example, the commercial products available under the trademarks Fortron® from Ticona or Ryton® GR06 from Phillips Petroleum), or mixtures thereof.

Other thermoplastic crystalline polymers (b) which may be used according to the present invention may be selected from: polyesters such as, polybutylene terephthalate, polyethylene naphthalate; polyamides such as, for example, 12-nylon, 6,6-nylon, 11-nylon; or mixtures thereof.

The thermoplastic crystalline polymer (b) is preferably present in the thermoplastic material in an amount of from 10% to 45% by weight, more preferably of from 20% to 35% by weight, with respect to the weight of the thermoplastic material.

With regards to the amorphous polymer (c), in order to suitably increase the Vicat point of the thermoplastic material, said amorphous polymer (c) has, preferably, a glass transition temperature ($T_g$) higher than 180° C., more preferably not higher than 350° C.

According to one preferred embodiment, said amorphous polymer (c) may be selected from: cycloolefin random copolymers (such as, for example, the commercial products available under the trademark Topas® from Ticona; or the random cycloolefin copolymers disclosed, for example, in U.S. Pat. Nos. 5,494,969, 5,741,869 and 5,569,711); polyphenyleneoxide (such as, for example, the commercial products available under the trademark Vestoran® from Hüls); aliphatic or aromatic hydrocarbon resins (such as, for example, the commercial products available under the trademark Krystalex® from Hercules), or mixtures thereof.

The amorphous polymer (c) is preferably present in the thermoplastic material in an amount of from 10% to 45% by weight, more preferably of from 20% to 35% by weight, with respect to the weight of the thermoplastic material.

In the case in which the thermoplastic elastomer (a) is selected from the styrene block copolymers or terpolymers with different olefins and/or with dienes (a2) or from the copolymer of ethylene with at least one aromatic α-olefin (a3), the thermoplastic material also advantageously comprises at least a processing oil (d).

The processing oil (d) may be selected from minerals oils, vegetable oils, synthetic oils, or mixtures thereof such as, for example, aromatic oils, naphthenic oil, paraffinic oil, phthalates, soybean oil, or mixture thereof.

The processing oil (d) is preferably present in the thermoplastic material, in an amount of from 2% to 100% by weight, more preferably of from 5% to 70% by weight, with respect to the weight of the thermoplastic material.

The thermoplastic material (a), may also comprise at least an anti-hydrolysis agent which may be selected from: polycarbodiimides, 2-oxazolines, and mixture thereof. Said anti-hydrolysis agent is preferably present in the termoplastic material in an amount of from 0.1% to 2% by weight, more preferably of from 0.5% to 1% by weight, with respect to the weight of the thermoplastic material.

According to one preferred embodiment, the thermoplastic material is a copolyether ester or a copolyester ester (a1). Preferably, the thermoplastic material is a copolyether ester (a1).

According to a further preferred embodiment, the thermoplastic material comprises at least one copolyether ester (a1) or a copolyester ester. Preferably, the thermoplastic material comprises at least one copolyether ester (a1).

According to a further preferred embodiment, the thermoplastic material comprises at least one styrene block copolymer or terpolymer with different olefins and or with dienes (a2); at least one thermoplastic crystalline polymer (b); and at least one processing oil (d). Preferably, said styrene block copolymer or terpolymer with different olefins and or with dienes (a2) is a styrene-ethylene/butene-styrene (S-EB-S) triblock polymer, said thermoplastic crystalline polymer (b) is a syndiotactic polystyrene and said processing oil (d) is a paraffinic oil.

Conventional additives may be added for the purpose of improving the fundamental characteristics of the abovementioned thermoplastic material. For example, adhesion promoters such as, for example, organosilanes, (for example, aminetrimethoxysilane), plasticizers, surfactants capable of improving the wettability ("wetting") of the coating on the glass portion of the optical fiber, antioxidants, UV stabilizers, may be added. Said conventional additives are preferably present in the abovementioned thermoplastic material in an amount of from 0.1% to 20% by weight, more preferably of from 0.5% to 10% by weight, with respect to the weight of the thermoplastic material.

In addition, when one and the same cable internally contains several optical fibers, the operator must be able to identify the different fibers with certainty, hence it is convenient to colour the various fibers with differents identifying colours.

As disclosed above, at least one colouring agent may be added to the thermoplastic material. Said colouring agent may be selected from pigments, dyes, coloured fillers and admixed with the thermoplastic material.

Said colouring agent is preferably present in the abovementioned thermoplastic material in an amount of from 0.1% to 10% by weight, more preferably of from 0.5% to 5% by weight, with respect to the weight of the thermoplastic material.

Moreover, pigments containig particles of a diameter exceeding 5 μm may cause some problems, in particular if the coating is directly positioned onto the glass portion of the optical fiber. In fact, said particles, may give rise to microcurvatures in said glass portion, which cause the microbending and the consequent attenuation of the trasmitted signal.

According to a preferred embodiment, the optical fiber of the present invention is thus preferably coated with an inner layer of thermoplastic material directly positioned onto the glass portion, having about 30 μm thickness and, subsequently, with an outer layer of the same thermoplastic material comprising at least one colouring agent, directly positioned onto said inner layer, having about 30 μm thickness (total thickness of the coating equal to about 60 μm).

The optical fiber may be coated by means of different processes. For example, the thermoplastic material may be melted and the molten material is extrusion-coated on the surface of the optical fiber using a screw type extruder, fiber coating within the die head, fiber coating outside the die head (including suction), a gear pump type extruder, or the like. In the case of the application of the two layers the extrusion may be advantageously carried out in a single pass, for example by means of the "tandem" technique, in which individual extruders arranged in series are used, or by means of co-extrusion with a multiple-extrusion head.

BRIEF DESCRIPTION OF THE DRAWINGS

The present invention may be understood more clearly with reference to the following attached figures.

DETAILED DESCRIPTION OF THE INVENTION

Figure 1:
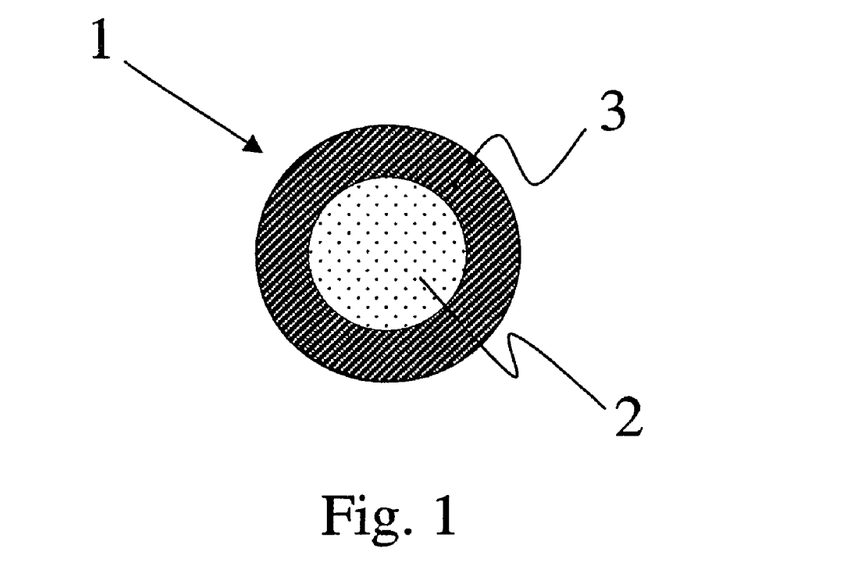
FIG. 1: is a cross section of an optical fiber according to the present invention.

FIG. 1 shows an optical fiber (1) according to the present invention, comprising a glass portion (2) which includes a core and a cladding, the core having a higher refraction index than the cladding, which is covered with a single coating layer (3) of thermoplastic material.

Figure 2:
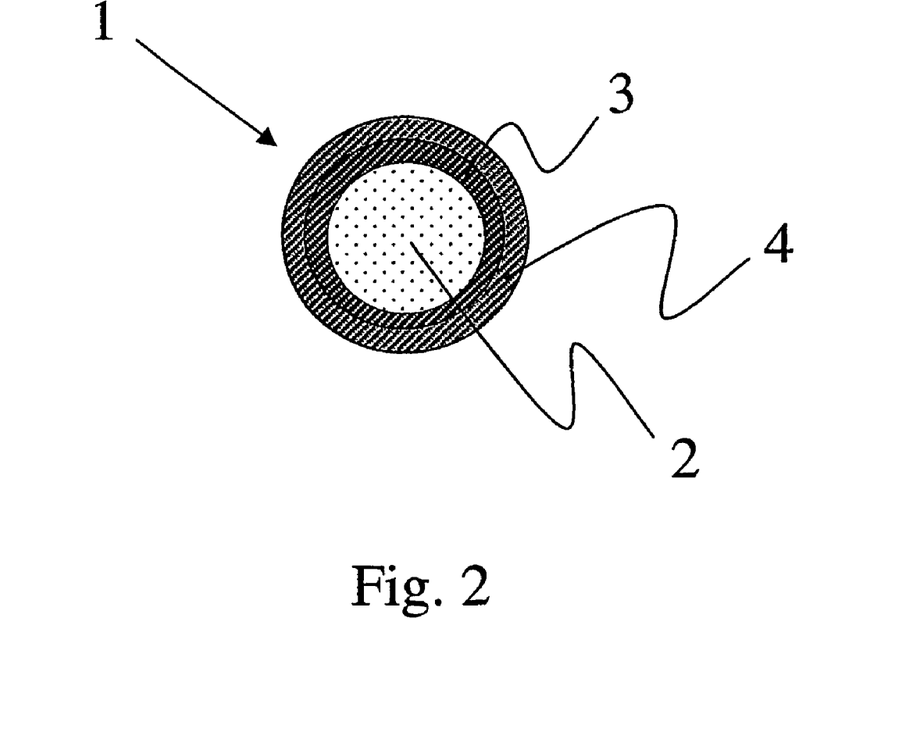
FIG. 2: is a cross section of a coloured optical fiber according to the present invention.

FIG. 2 shows a coloured optical fiber (1) according to the present invention, comprising a glass portion (2) which includes a core and a cladding, the core having a higher refraction index than the cladding, which is covered with a coating comprising two layers: an inner layer (3) of thermoplastic material and an outer layer (4) of the same thermoplastic material comprising at least one colouring agent.

Figure 3:
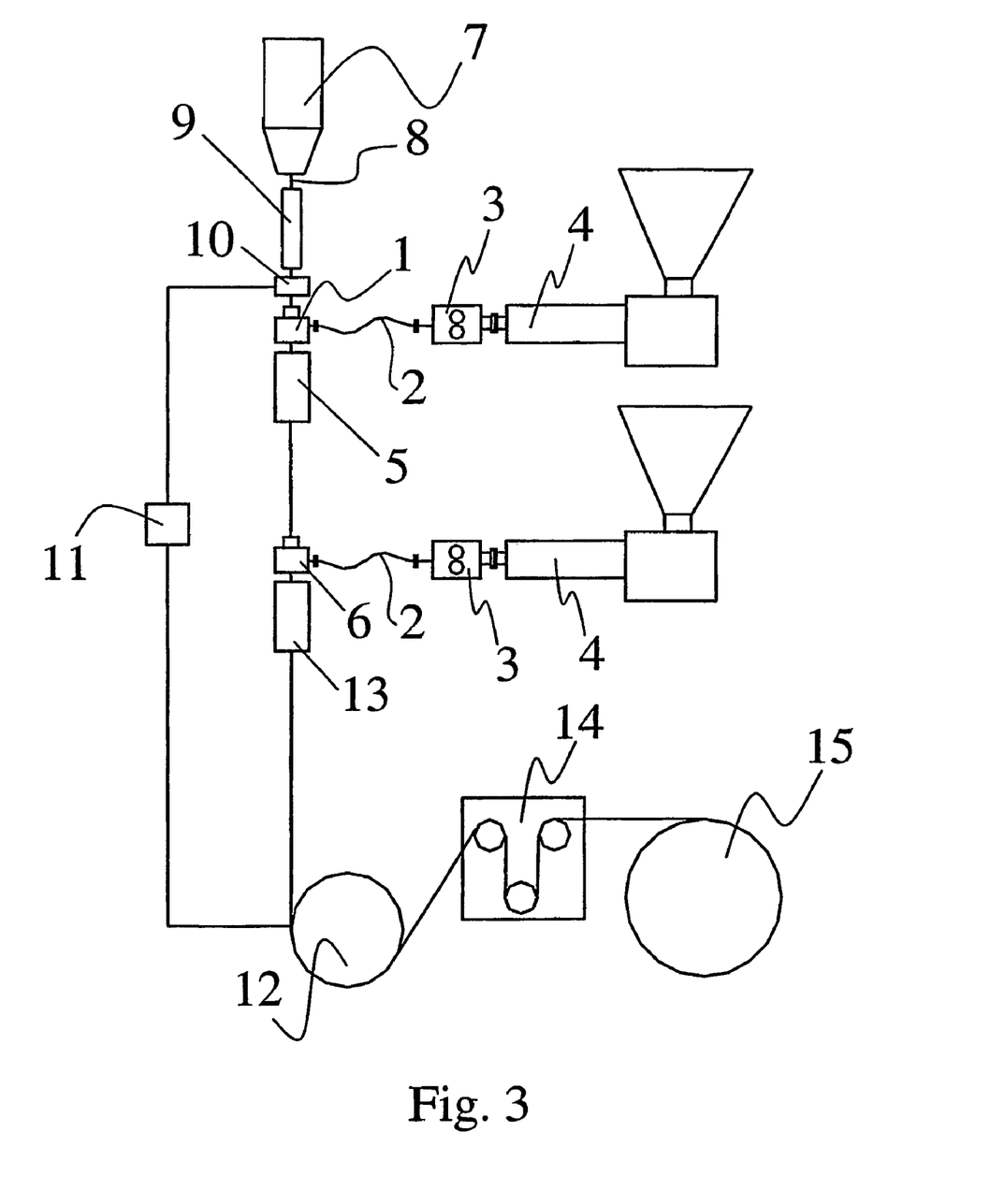
FIG. 3: is the general scheme of a system (drawing tower) for producing an optical fiber according to the present invention.

An optical fiber according to the present invention may be produced according to the usual drawing techniques, using, for example, a system such as the one schematically illustrated in FIG. 3.

This system, commonly known as a "drawing tower", typically comprises a furnace (7) inside which is placed a glass optical preform to be drawn. The bottom part of said preform is heated to the softening point and drawn into an optical fiber (8). The fiber is then cooled, preferably to a temperature of not less than 60° C., preferably in a suitable cooling tube (9) of the type described, for example, in patent application WO 99/26891, and passed through a diameter measurement device (10). This device is connected by means of a microprocessor (11) to a pulley (12) which regulates the drawing speed; in the event of any variation in the diameter of the fiber, the microprocessor (11) acts to regulate the rotational speed of the pulley (12), so as to keep the diameter of the optical fiber constant. Then, the fiber passes through a first coating applicator (1), which is connected with a first screw type extruder (4) through an anti-vibration conduit (2) and a gear pump (3) which may be omitted, containing the coating composition (thermoplastic material), and is covered with this composition to a thickness of about 30 μm. Subsequently the coated fiber may pass through a cooling device (5) in which the coated fiber is cooled by air or by an inert gas. Then, the coated fiber passes through a second applicator device (6) which is connected with a second screw type extruder (4) through an anti-vibration conduit (2) and a gear pump (3) which may be omitted, containing the coating composition (thermoplastic material comprising at least one colouring agent) and is covered with this composition to a final thickness of about 60 μm. Subsequently the coated fiber passes through a second cooling device (13) in which the coated fiber is cooled by air or by an inert gas.

FIG. 3 represents the application of the two layers by means of the "tandem" technique above disclosed. Alternatively, in the case in which a single layer is applied, only the first coating applicator (1), which is connected with a first screw type extruder (4) through an anti-vibration conduit (2) and a gear pump (3) which may be omitted, containing the coating composition (thermoplastic material), is present and the fiber is covered with this composition to a thickness of about 60 μm in one step.

Subsequently to the coating, the fiber may optionally be caused to pass through a device capable of giving a predetermined torsion to this fiber, for example of the type described in international patent application WO 99/67180, for the purpose of reducing the PMD ("Polarization Mode Dispersion") value of this fiber. The pulley (12) placed downstream of the devices illustrated previously controls the spinning speed of the fiber. After this drawing pulley, the fiber passes through a device (14) capable of controlling the tension of the fiber, of the type described, for example, in patent application EP 1 112 979, and is finally collected on a reel (15).

Figure 4:
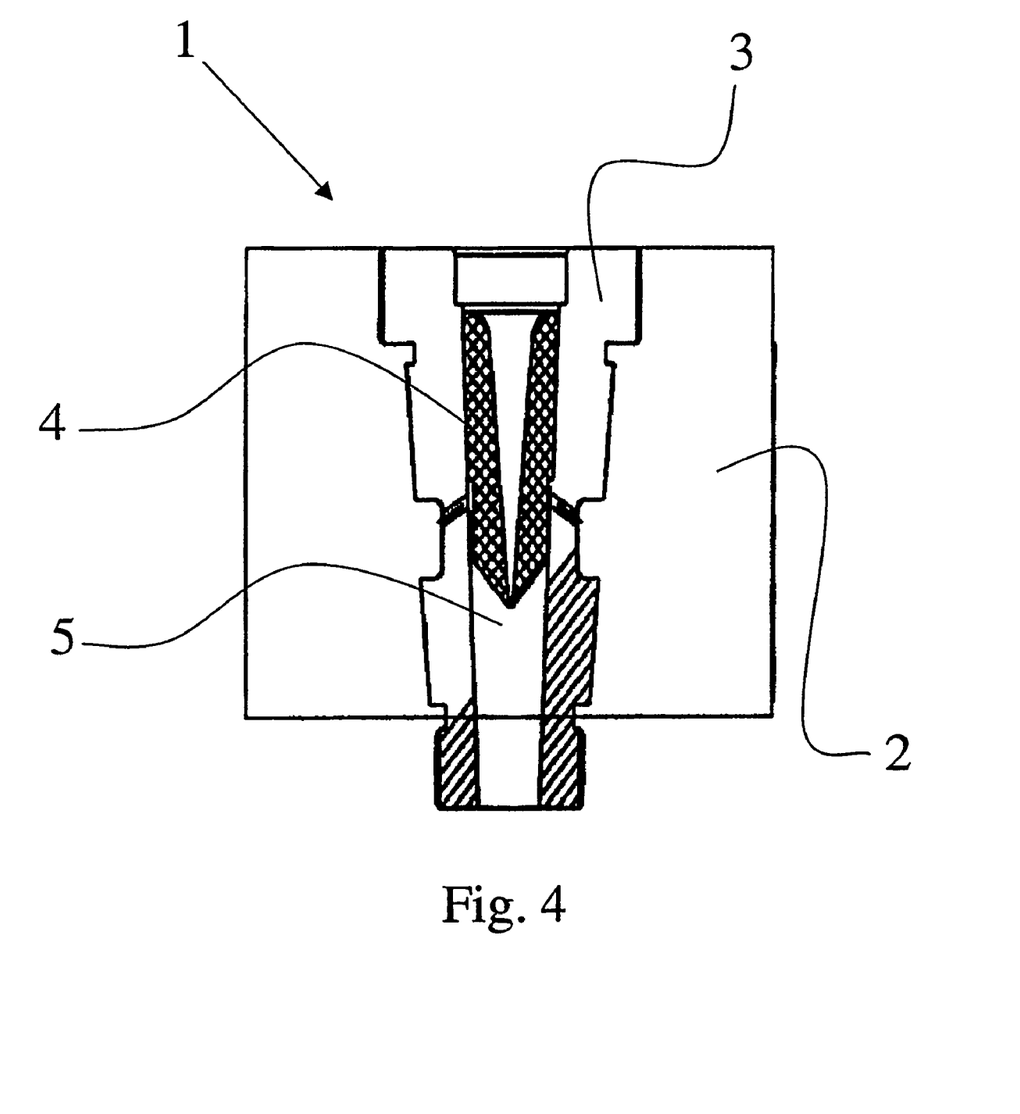
FIG. 4 is a cross section of an applicator.

FIG. 4 shows an applicator (1) comprising a temperature regulated main body (2), a dies holder cartridge (3), a male die (4) and a female die (5).

An optical fiber thus produced may be used in the production of optical cables. The fiber may be used either as such or in the form of ribbons comprising several fibers combined together by means of a common coating.

The present invention will be further illustrated hereinbelow by means of a number of implementation examples that are provided purely as a guide and are non-limiting on the invention.

EXAMPLES 1–4

Thermoplastic Materials

The following thermoplastic materials were used: the amounts of the components (% by weight) are given in Table 1.

TABLE 1

| EXAMPLE | 1 | 2 | 3 | 4 |
|---|---|---|---|---|
| Arnitel ® EM400 | 100 | — | — | — |
| Arnitel ® EM460 | — | 100 | — | — |
| Questra ® QA101 | — | — | 30 | 25.0 |
| Kraton ® G1651 | — | — | 49 | 52.5 |
| Flexon ® 815 | — | — | 21 | 22.5 |

Arnitel ® EM400: copolyether-ester from DSM;
Arnitel ® EM460: copolyether-ester from DSM;
Questra ® QA101: syndiotactic polystyrene from Dow Chemical;
Kraton ® G1651: styrene-ethylene/butene-styrene from Kraton Polymer;
Flexon ® 815: paraffinic oil from Exxon.

The thermoplastic materials of Example 3 and 4, were prepared by feeding the Questra® QA101 granules and the Kraton® G1651 granules which have been previously treated with a Flexon® 815 in a turbo mixer in order to allow the absorption of the paraffinic oil into the Kraton® G1651 granules, into a 20 mm double-screw Brabender mixer, at a temperature of about 270° C., until a complete homogenization was reached. The thermoplastic material left the double-screw mixer in the form of granules.

The thermoplastic materials of Examples 1–4, were subjected to the following measurements.

Plates having 1 mm thickness were prepared by press-molding working at the following conditions:
 pre-heating at 220° C. (Examples 1 and 2) or at 290° C. (Examples 3 and 4), for 10 min;
 press-molding, at the same pre-heating temperature, for 10 min;
 cooling with water at room temperature.

The melting point was measured by differential scanning calorimetry by using a Mettler Toledo DSC 820 differential scanning calorimeter. The temperature program below reported was applied to the samples to be analysed:
 heating up to 50° C. above the melting point of the sample;
 cooling at −60° C.;
 heating up to 10° C. above the melting point of the sample.

The obtained data are given in Table 2.

The Vicat point was measured according to ISO 306/A Standard, at 10N: the obtained data are given in Table 2.

The Melt Flow Index (MFI) was measured according to ASTM D1238-01e1 Standard, under 2.16 kg and at temperature 30° C. higher with respect to the melting point of the sample: the obtained data are given in Table 2.

The Refractive Index of the thermoplastic materials of Examples 1–2 was measured by means of an Abbe refractometer at 23° C. (Sodium D-line at 598 nm). The obtained data are the following:
 Example 1: 1.52;
 Example 2: 1.5.2.

TABLE 2

| EXAMPLE | MELTING POINT (° C.) | VICAT POINT (° C.) | MFI (gr/10 min) |
|---|---|---|---|
| 1 | 200 | 130 | 28 |
| 2 | 185 | 150 | 38 |
| 3 | 270 | 91 | 1.8 |
| 4 | 270 | 86 | 1.5 |

Modulus of Elasticity Values

Plates obtained as disclosed above, were conditioned for 24 hours, at 25° C. and at 50% relative humidity, and were then subjected to measurement of the modulus of elasticity value by means of a DMTA (Dynamic Mechanical Thermal Analyser from Reometrics Inc.), at a frequency of 1 Hz and at a heating rate of 2° C./min over the temperature range between −60° C. and +120° C.

The results obtained, relating to the modulus of elasticity values measured at +25° C., at +60° C. and at −40° C., are given in Table 3.

In Table 3 is also given the ratio between the modulus of elasticity values at −40° C. and the modulus of elasticity value at +60° C.

H$_2$O Absorption of the Plates

The plates obtained as described above, predried in an atmosphere flushed with dry air for 48 hours, were subjected to controlled absorption of H$_2$O. To this end, the Igasorp machine from Hiden Analytical was used, working at a temperature of 55° C., with a relative humidity of 95%, until an asintotic value in the absorption of the water content was reached.

The results obtained, expressed as a percentage absorption of absorbed water, are given in Table 3.

TABLE 3

| EXAMPLE | 1 | 2 | 3 | 4 |
|---|---|---|---|---|
| Modulus at +25° C. | 54 | 110 | 95 | 58 |
| Modulus at −40° C. | 379 | 330 | 300 | 190 |
| Modulus at +60° C. | 42 | 73 | 75 | 45 |
| Modulus at −40° C./Modulus at +60° C. | 9.0 | 4.5 | 4.0 | 4.1 |
| H$_2$O absorption (%) | 0.9 | 1 | 0.7 | 0.7 |

EXAMPLE 5

Production of an Optical Fiber

A clad-type optical fiber of quartz glass having a diameter of 125 μm was coated by extrusion utilizing a screw type extruder by Gimac having a diameter of 12 mm and a tubing die. The temperature profile of the extruder was the following: 210/220/245/260° C. The drawing speed was 200 m/min and 400 m/min. The single coating made from the thermoplastic material according to the present invention (Examples 1 and 2), was applied to a thickness of 60 μm.

A test specimen of the optical fiber thus obtained was subjected to a strip test according to the Bellcore Standard GR-20-CORE, July 1998, section 4.4.2. To this end, the fiber was conditioned at room temperature, with a humidity of 50%, for 7 days. The optical fiber coating gave an average strip force value of 5.6 N in the case of Example 2 and 3.1 N in the case of Example 1: the obtained data are in according with the above Standard.

Hydrogen Emission Measurement

The optical fiber obtained as disclosed above, coated with the thermoplastic material of Example 1, was subjected to hydrogen emisssion measurement. The hydrogen emission measurement was carried out at 80° C. for 1 month and at 220° C. for 1 hour, respectively. The optical fiber was broken into small pieces (6 g of fiber) and was introduced into a test tube which was ermetically closed under vacuum (inert atmosphere). At the end, the inert atmosphere was analysed by means of a Hewlett-Packard Mod. 5480 gas chromatograph to detect any traces of hydrogen.

The obtained results are the following:
 80° C. for 1 month: 0.05 cm$^3$/kg;
 220° C. for 1 hour: 0.032 cm$^3$/kg.

The invention claimed is:

1. An optical fiber comprising:
 a glass portion;
 at least one protective coating of thermoplastic material comprising at least one thermoplastic elastomer;
 said thermoplastic material having the following characteristics:
 a modulus of elasticity value at +25° C. lower than 150 MPa; and
 a Vicat point higher than 85° C.

2. The optical fiber according to claim 1, wherein the thermoplastic material has a modulus of elasticity value at +25° C. of at least 10 MPa.

3. The optical fiber according to claim 2, wherein the thermoplastic material has a modulus of elasticity value at +25° C. higher than 20 MPa.

4. The optical fiber according to claim 1, wherein the thermoplastic material has a Vicat point higher than 120° C.

5. The optical fiber according to claim 4, wherein the thermoplastic material has a Vicat point lower than 350° C.

6. The optical fiber according to claim 1, wherein the thermoplastic material has a melting point higher than 180° C.

7. The optical fiber according to claim 6, wherein the thermoplastic material has a melting point not higher than 350° C.

8. The optical fiber according to claim 1, wherein the thermoplastic material has a water absorption value, measured at 55° C., not higher than 2%.

9. The optical fiber according to claim 8, wherein the thermoplastic material has a water absorption value, measured at 55° C., not higher than 1%.

10. The optical fiber according to claim 1, wherein the thermoplastic material has a Melt Flow Index (MFI) higher than 1 g/10 min.

11. The optical fiber according to claim 10, wherein the thermoplastic material has a Melt Flow Index (MFI) higher than 5 g/10 min.

12. The optical fiber according to claim 11, wherein the thermoplastic material has a Melt Flow Index (MFI) of between 10 g/10 min and 100 g/10 min.

13. The optical fiber according to claim 1, wherein the ratio between the modulus of elasticity value at −40° C. and the modulus of elasticity value at +60° C. of the thermoplastic material is lower than 15.

14. The optical fiber according to claim 13, wherein the ratio between the modulus of elasticity value at −40° C. and the modulus of elasticity value at +60° C. of the thermoplastic material is between 1 and 10.

15. The optical fiber according to claim 1, wherein the thermoplastic material is a thermoplastic elastomer (a).

16. The optical fiber according to claim 1, wherein the protective coating is a single protective coating which is directly positioned onto the glass portion.

17. The optical fiber according to claim 16, wherein the single protective coating includes an inner layer of thermoplastic material directly positioned onto the glass portion, and an outer layer of thermoplastic material comprising at least one colouring agent directly positioned onto said inner layer.

18. The optical fiber according to claim 1, wherein the thermoplastic elastomer is selected from:
(a1) copolyether esters or copolyester esters;
(a2) styrene block copolymers or terpolymers with different olefins and/or with dienes; or
(a3) copolymer of ethylene with at least one aromatic α-olefin.

19. The optical fiber according to claim 18, wherein the copolyether esters comprise poly[($C_1$–$C_8$) linear or cyclic] alkylene terephthalate segments and poly($C_1$–$C_8$) linear alkylene oxide segments.

20. The optical fiber according to claim 19, wherein the poly[($C_1$–$C_8$) linear or cyclic]alkylene terephthalate segments are selected from: poly(butylene-naphthalene dicarboxylic acid), poly(cyclohexanedicarboxylic acid-cyclohexanemethanol), polybutyleneterephthalate and polytrimethyleneterephthalate-2,6-naphthalate.

21. The optical fiber according to claim 19, wherein the poly($C_1$–$C_8$) linear alkylene oxide segments are selected from polyalkylene oxides.

22. The optical fiber according to claim 21, wherein the polyalkylene oxides are polytetramethylene oxide, polypropylene oxide, or polyethylene oxide.

23. The optical fiber according to claim 18, wherein the copolyester esters comprise poly[($C_1$–$C_8$) linear or cyclic] alkylene terephthalate segments and ($C_1$–$C_8$) linear aliphathic polyester segments.

24. The optical fiber according to claim 23, wherein the poly(($C_1$–$C_8$) linear or cyclic)alkylene terephthalate segments are selected from: poly(butylene-naphthalene dicarboxylic acid), poly(cyclohexanedicarboxylic acid-cyclohexanemethanol), polybutyleneterephthalate and polytrimethyleneterephthalate-2,6-naphthalate.

25. The optical fiber according to claim 23, wherein the ($C_1$–$C_8$) linear aliphathic polyester segments are selected from: polybutylene adipate, polytetramethylene adipate, or polycaprolactone.

26. The optical fiber according to claim 18, wherein the styrene block copolymers or terpolymers with different olefins and/or with dienes (a2) are selected from: styrene-butadiene-styrene (S-B-S), styrene-isoprene-styrene (S-I-S) and styrene-ethylene/butene-styrene (S-EB-S) triblock polymers; styrene-ethylene/propylene (S-EP) and styrene-ethylene/butene (S-EB) diblock polymers; styrene-butadiene or styrene-isoprene branched polymers.

27. The optical fiber according to claim 18, wherein in the copolymer (a3), the aromatic α-olefin is an olefin of formula (I):

$$CH_2{=}CH{-}(R_1R_2C)_x{-}C_6H_{5-y}(R_3)_y \qquad (I)$$

wherein $R_1$, $R_2$ and $R_3$, which may be identical to or different from each other, represent hydrogen or a linear or branched alkyl group containing from 1 to 8 carbon atoms; or $R_3$, different from $R_1$ and $R_2$, represents an alkoxy group, a carboxyl group, an acyloxy group, said acyloxy group optionally being substituted with alkyl groups containing from 1 to 8 carbon atoms or hydroxyl groups or halogen atoms; x is 0 or an integer between 1 and 5 inclusive; and y is 0, 1 or 2.

28. The optical fiber according to claim 27, wherein the olefin of formula (I) is styrene; mono- or poly-alkylstyrenes; styrene derivatives containing functional groups; phenyl-substituted alkenes; or mixtures thereof.

29. The optical fiber according to claim 1, wherein the thermoplastic material comprises at least one thermoplastic crystalline polymer (b).

30. The optical fiber according to claim 29, wherein the thermoplastic crystalline polymer (b) has a melting point higher than 180° C.

31. The optical fiber according to claim 30, wherein the thermoplastic crystalline polymer (b) has a melting point not higher than 350° C.

32. The optical fiber according to claim 29, wherein the thermoplastic crystalline polymer (b) is selected from: syndiotactic polystyrene; poly(4-methyl-1-pentene), either as a homopolymer or as a copolymer with an α-olefin; polyketones; poly(phenylene sulfide); or mixtures thereof.

33. The optical fiber according to claim 29, wherein the thermoplastic crystalline polymer (b) is selected from: polyesters; polyamide; or mixtures thereof.

34. The optical fiber according to claim 29, wherein the thermoplastic crystalline polymer (b) is present in the thermoplastic material in an amount of 10% to 45% by weight with respect to the weight of the thermoplastic material.

35. The optical fiber according to claim 34, wherein the thermoplastic crystalline polymer (b) is present in the thermoplastic material in an amount of 20% to 35% by weight with respect to the weight of the thermoplastic material.

36. The optical fiber according to claim 1, wherein the thermoplastic material comprises at least one amorphous polymer (c).

37. The optical fiber according to claim 36, wherein the amorphous polymer (c) has a glass transition temperature ($T_g$) higher than 180° C.

38. The optical fiber according to claim 36, wherein the amorphous polymer (c) has a glass transition temperature ($T_g$) not higher than 350° C.

39. The optical fiber according to claims 36, wherein the amorphous polymer (c) is selected from: cycloolefin random copolymers; polyphenyleneoxide; aliphatic or aromatic hydrocarbon resins; or mixtures thereof.

40. The optical fiber according claim 36, wherein the amorphous polymer (c) is present in the thermoplastic material in an amount of 10% to 45% by weight with respect to the weight of the thermoplastic material.

41. The optical fiber according to claim 40, wherein the amorphous polymer (c) is present in the thermoplastic material in an amount of 20% to 35% by weight with respect to the weight of the thermoplastic material.

42. The optical fiber according to claim 18, wherein the thermoplastic material comprises at least one styrene block copolymer or terpolymer with different olefins and/or with dienes (a2) or at least one copolymer of ethylene with at least one aromatic α-olefin and at least a processing oil (d).

43. The optical fiber according to claim 42, wherein the processing oil (d) is selected from mineral oils, vegetable oils, synthetic oils, or mixtures thereof.

44. The optical fiber according to claim 42, wherein the processing oil (d) is present in the thermoplastic material in an amount of 2% to 100% by weight with respect to the weight of the thermoplastic material.

45. The optical fiber according to claim 44, wherein the processing oil (d) is present in the thermoplastic material in an amount of 5% to 70% by weight with respect to the weight of the thermoplastic material.

46. The optical fiber according to claim 1, wherein the thermoplastic material comprises at least an anti-hydrolysis agent.

47. The optical fiber according to claim 1, wherein the thermoplastic material comprises at least one colouring agent selected from pigments, dyes, or coloured fillers.

48. The optical fiber according to claim 47, wherein the colouring agent is present in the thermoplastic material in an amount of 0.1% to 10% by weight with respect to the weight of the thermoplastic material.

49. The optical fiber according to claim 48, wherein the colouring agent is present in the thermoplastic material in an amount of 0.5% to 5% by weight with respect to the weight of the thermoplastic material.

* * * * *